United States Patent
Wu et al.

(10) Patent No.: US 11,575,916 B2
(45) Date of Patent: Feb. 7, 2023

(54) TOP PALETTE COLORS SELECTION USING SORTING FOR PALETTE MODE IN VIDEO ENCODING

(71) Applicants: Advanced Micro Devices, Inc., Santa Clara, CA (US); ATI Technologies ULC, Markham (CA)

(72) Inventors: Shu-Hsien Wu, Markham (CA); Crystal Yeong-Pian Sau, Markham (CA); Yang Liu, Markham (CA); Wei Gao, Markham (CA); Feng Pan, Markham (CA); Ihab M. A. Amer, Markham (CA); Ying Luo, Markham (CA); Edward A. Harold, Markham (CA); Gabor Sines, Markham (CA); Ehsan Mirhadi, Santa Clara, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/086,160

(22) Filed: Oct. 30, 2020

(65) Prior Publication Data
US 2022/0141472 A1    May 5, 2022

(51) Int. Cl.
*H04N 19/186* (2014.01)
*H04N 19/136* (2014.01)
*H04N 19/182* (2014.01)
*H04N 19/189* (2014.01)
*H04N 19/593* (2014.01)

(52) U.S. Cl.
CPC ......... *H04N 19/186* (2014.11); *H04N 19/136* (2014.11); *H04N 19/182* (2014.11); *H04N 19/189* (2014.11); *H04N 19/593* (2014.11)

(58) Field of Classification Search
CPC ... H04N 19/186; H04N 19/182; H04N 19/136
See application file for complete search history.

(56) References Cited

U.S. PATENT DOCUMENTS

| | | | | |
|---|---|---|---|---|
| 10,116,962 B2* | 10/2018 | Kazui | ................... | H04N 19/182 |
| 2015/0146976 A1* | 5/2015 | Ma | ...................... | H04N 19/593 |
| | | | | 382/166 |
| 2016/0100161 A1* | 4/2016 | Chang | ..................... | H04N 19/44 |
| | | | | 375/240.12 |
| 2016/0100178 A1* | 4/2016 | Lin | ......................... | H04N 19/70 |
| | | | | 382/166 |
| 2017/0054990 A1* | 2/2017 | Itoh | ....................... | H04N 19/593 |
| 2017/0264909 A1* | 9/2017 | Koyama | ................. | H04N 19/93 |
| 2021/0124500 A1* | 4/2021 | Salamat | ................ | G06F 3/0679 |

* cited by examiner

*Primary Examiner* — Francis Geroleo
(74) *Attorney, Agent, or Firm* — Volpe Koenig

(57) ABSTRACT

An encoding method is provided which includes receiving a plurality of images, obtaining values of elements in a portion of the images, sorting the elements according to different values of the elements, sorting the elements according to a number of occurrences of the different values and encoding the elements using a subset of the different values having corresponding numbers of occurrences that are higher than corresponding numbers of occurrences of other values. Examples also include a processing device and method for use with palette mode encoding in which the elements are a portion of pixels in images and the values are color values of the portion of pixels in the images.

20 Claims, 5 Drawing Sheets

| Color Value | 101 | 87 | 25 | 43 | 87 | 25 | 87 | 16 | 502 |
|---|---|---|---|---|---|---|---|---|---|
| Counter | 1 | 1 | 1 | 1 | 1 | 1 | 1 | 1 | |

| Color Value | 16 | 25 | 25 | 43 | 87 | 87 | 87 | 101 | 504 |
|---|---|---|---|---|---|---|---|---|---|
| Counter | 1 | 2 | 0 | 1 | 3 | 0 | 0 | 1 | |

| Color Value | 101 | 87 | 25 | 43 | 87 | 25 | 87 | 16 |
|---|---|---|---|---|---|---|---|---|
| Counter | 1 | 1 | 1 | 1 | 1 | 1 | 1 | 1 |

| Color Value | 16 | 25 | 25 | 43 | 87 | 87 | 87 | 101 |
|---|---|---|---|---|---|---|---|---|
| Counter | 1 | 2 | 0 | 1 | 3 | 0 | 0 | 1 |

| Color Value | 87 | 25 | 16 | 43 | 101 | 25 | 87 | 87 |
|---|---|---|---|---|---|---|---|---|
| Counter | 3 | 2 | 1 | 1 | 1 | 0 | 0 | 0 |

TOP PALETTE COLORS SELECTION USING SORTING FOR PALETTE MODE IN VIDEO ENCODING

BACKGROUND

Due to the rise of video applications such as virtual desktop infrastructure (VDI), remote desktop sharing and wireless displays, there is a growing demand for improved coding efficiency of screen content (e.g., computer generated video with a large amount of text and graphics). A new intra prediction mode, known as palette mode, has recently been introduced (e.g., in video coding standards, such as High Efficiency Video Coding (HEVC)) as a video coding (e.g., compression) technique for improving the coding efficiency of screen content.

While other intra and inter prediction techniques target removing redundancy between different coding units (e.g., different portions of pixels in the video, such as portions of a frame or picture, a frame, a picture or a group of frames or pictures), palette coding targets the redundancy of repetitive pixel values or patterns within a coding portion of the video. Palette mode includes a palette table with 2 to 8 representative colors of the video portion and color indices for each pixels within the coding portion. The mapped indices are the run-length coded.

BRIEF DESCRIPTION OF THE DRAWINGS

A more detailed understanding can be had from the following description, given by way of example in conjunction with the accompanying drawings wherein:

FIG. 5A is a table illustrating example pixel color values of unsorted pixels being processed;

FIG. 5B is a table illustrating the pixels sorted according to their color pixel values; and FIG. 5C is a table illustrating the pixels sorted according to their corresponding pixel color value counts.

DETAILED DESCRIPTION

Figure 1:
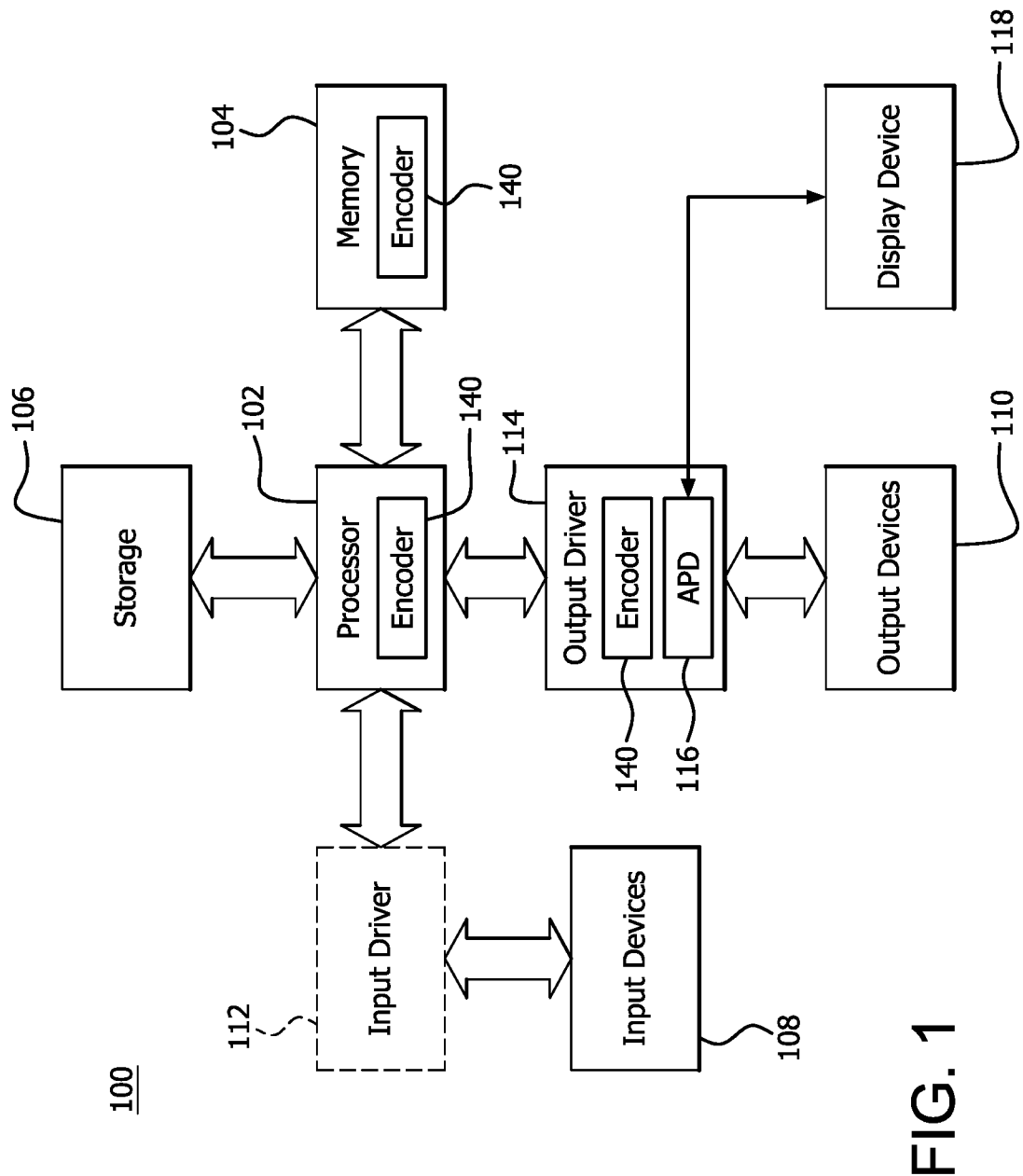
FIG. 1 is a block diagram of an example device in which one or more features of the disclosure can be implemented.

Palette mode coding includes determining the most common pixel color values for a portion of pixels (e.g., block of pixels in a frame, such as an 8×8 block, a 16×16 block or a 32×32 block). The number of pixel color values includes, for example, 256 color values (i.e., values of 0-255 for an 8-bit integer value) or 1024 color values (i.e., values of 0-1023 for an 10-bit integer value). For example, palette mode coding determines the 8 most common pixel values in a portion of pixels being processed.

Conventional palette mode coding techniques typically determine the most common pixel values for a portion of pixels being processed by first recording the occurrences of each possible color value (e.g., occurrences of each of the 256 color values) in the portion of pixels being processed using a numerical representation (e.g., a histogram representation). For example, the color value of each pixel is compared to the 256 color values (e.g., first compared to color value 0, then color value 1 and so on) until the matching color value is determined. Next, the color values are sorted according to the number of occurrences for each color value and then the color values having the top N (e.g., 8) number of occurrences are determined. The color value of each pixel is then compared to the top N color values to determine which pixel value to use to efficiently encode the portion of pixels.

These conventional techniques are, however, inefficient for several reasons. During processing of each portion of pixels, these conventional techniques consider the color values of each possible color (e.g., each of the 256 color values) regardless of whether a color value is present in the portion of pixels being processed, exponentially increasing the amount of storage and compare operations used to process each portion of pixels. For example, 256 storage units and 256 comparators per pixel are required to create a histogram with each of the possible color values for 8-bit video encoding. Even worse, 10-bit video encoding requires 1024 storage units and 1024 comparators per pixel and 12-bit video encoding requires 4096 storage units and 4096 comparators per pixel.

For screen content, each portion of pixels typically includes a mere subset of each of the possible colors. Accordingly, some of the storage units will be redundant because each of these storage units will store a values of zero for colors that are not present in the portion of pixels. In addition, the bit depth increases the complexity of the sorting implementation because the counts (i.e., number of occurrences) for each possible color will be sorted.

Features of the present disclosure include devices and methods for efficiently determining the most common palette pixel color values for a portion of pixels during video coding. The apparatuses and methods described herein reduce the number of storage units, compare operations and sorting implementation complexity introduced by the conventional palette mode coding techniques.

Although the devices and methods for determining the most common pixel color values for palette mode coding, features of the present disclosure can be implemented for any histogram calculation which the number of elements being processed is smaller than the range of all possible element values.

A video encoding method is provided which comprises receiving a plurality of images, obtaining values of elements in a portion of the images, sorting the elements according to different values of the elements, sorting the elements according to a number of occurrences of the different values and encoding the elements using a subset of the different values having corresponding numbers of occurrences that are higher than corresponding numbers of occurrences of other values.

A palette mode encoding method is provided which comprises receiving a plurality of images, obtaining different color values for a portion of pixels in the images, sorting the portion of pixels according to the different color values, sorting the pixels according to a number of occurrences of the different color values and encoding the portion of pixels using a subset of the different values having corresponding numbers of occurrences that are higher than corresponding numbers of occurrences of other values.

A processing device for encoding video using palette mode encoding, the device comprising memory and a processor. The processor is configured to receive a plurality of images, obtain different color values for a portion of pixels in the images, sort the portion of pixels according to the different color values, sort the pixels according to a number of occurrences of the different color values and encode the portion of pixels using a subset of the different values having corresponding numbers of occurrences that are higher than corresponding numbers of occurrences of other values.

For simplification purposes, features of the present disclosure are described using pixels as elements (i.e., addressable elements), each representing a brightness and color for a point of an image. Features of the disclosure can be implemented, however, using elements (e.g., subpixels) in addition to, or alternative to, pixels of an image. Values of each element (e.g., pixels) of an image include a color value and a brightness value to represent the brightness and color for a point of an image.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. As shown in FIG. 1, the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. In addition to processing compute and graphics rendering commands and providing pixel output to display device 118, APD 116 may also control the encoder 140 for encoding video images according to features of the disclosure. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

A video encoder 140 is shown in two different alternative forms. In a first form, the encoder 140 is software that is stored in the memory 104 and that executes on the processor 102 as shown. In a second form, the encoder 140 is at least a portion of a hardware video engine (not shown) that resides in output driver 114. In other forms, the encoder 140 is a combination of software and hardware elements, with the hardware residing, for example, in output drivers 114, and the software executed on, for example, the processor 102.

Figure 2:
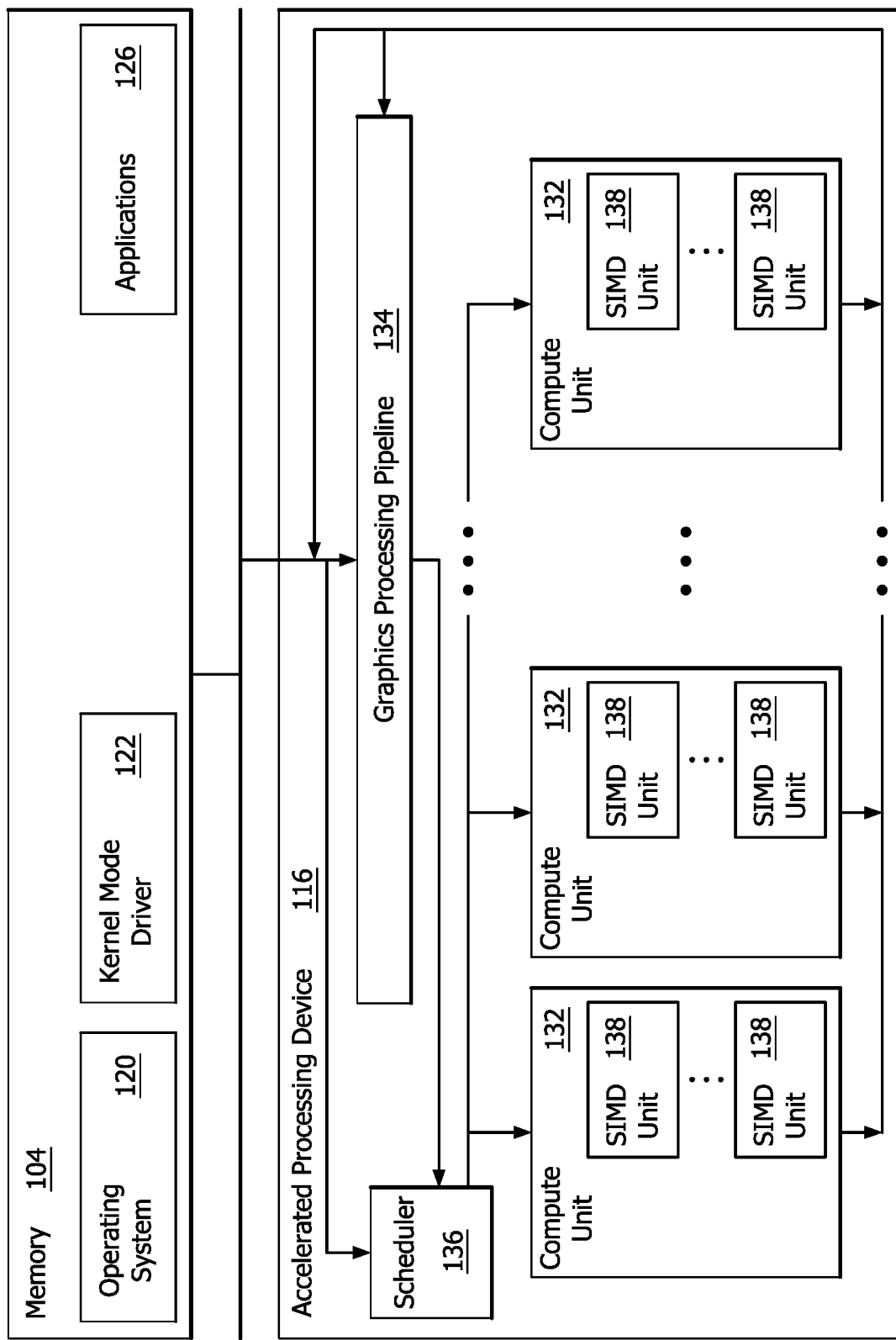
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
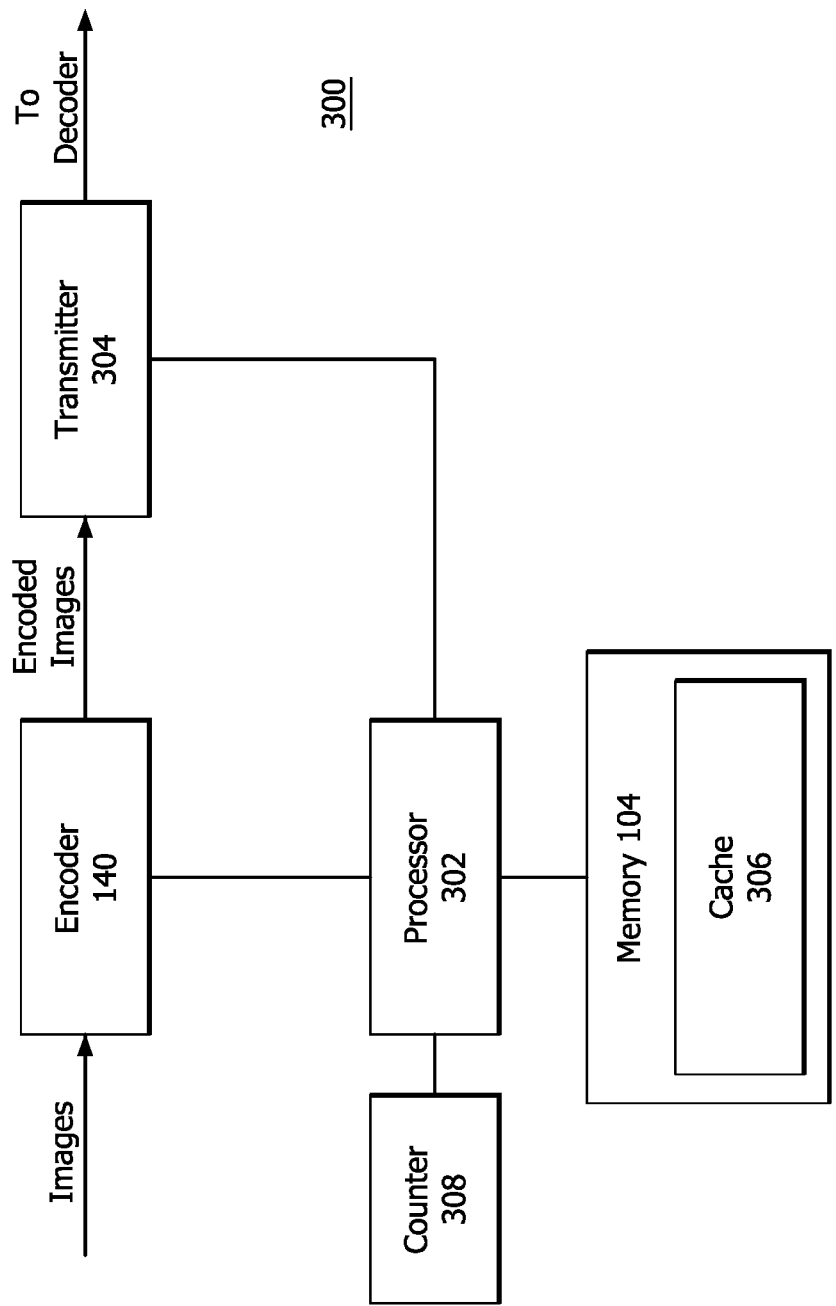
FIG. 3 is a block diagram illustrating exemplary components of a processing device in which one or more features of the disclosure can be implemented.

FIG. 3 is a block diagram illustrating exemplary components of a processing device 300 in which one or more features of the disclosure can be implemented. Processing device 300 is used to process and compress panoramic video images as described in more detail below. As shown in FIG. 3, processing apparatus 300 comprises processor 302, encoder 140, transmitter 304 memory 104, including cache 306, and counter 308.

Processor 302 is, for example, processor 102 (shown in FIG. 1), APD 116 (shown in FIGS. 1 and 2) or one or more compute units 132. As shown in FIG. 3, processor 302 is in communication with encoder 140, transmitter 304, memory 104, which includes cache 306 and counter 308. Encoder 140 is configured to receive video images and instructions from processor 302 and encode the video images to be decoded by a decoder (not shown) and displayed. The video images may be received from one or more video sources, such as a video capture device (e.g., a camera), a storage device (e.g., storage 106), a video content provider, and a device for generating graphics (e.g., APD 116).

Transmitter 304 is configured to receive the encoded images and provide the encoded images to be decoded and provided for display. The encoded video images are sent, for example, via a network interface controller (NIC) over one or more networks (e.g., local area network), including wired (e.g., Ethernet) or wireless networks (e.g., via WiFi, Bluetooth, and other wireless standards). Alternatively, transmitter 304 is configured to transmit the encoded video images to a decoder on the same processing apparatus 300 (e.g., via a local device bus).

Processor 302 is configured to control the encoder 140 for encoding video images according to features of the disclosure. For example, processor 302 is configured to control the video encoder 140 to sort a portion of pixels of the images according to the different color values, sort the pixels according to a number of occurrences of the different color values, select a subset of the different color values having corresponding numbers of occurrences that are higher than corresponding numbers of occurrences of other color values (e.g., the different values in the selected subset are the values having the N-most number of occurrences) and encode the portion of pixels using a subset of the different color values.

Processor 302 is configured to control the counter 308 to indicate the number of occurrences of each pixel color value for the portion of pixels being processed. The counter 308 can, for example, start at a value of 0 or 1 and be incremented to indicate the number of occurrences of each pixel color value. Alternatively, the counter 308 can start at a predetermined number and be decremented to indicate the number of occurrences of each pixel color value. The counter 308 can implemented via software, hardware or a combination of software and hardware.

Processor 302 is configured to store the color values of the pixels and the corresponding counts (i.e., number of occurrences) of the color values of the pixels in memory 104 (e.g., cache 306), including unsorted colors values of the pixels and their counts as well as sorted colors values of the pixels and their counts (e.g., sorted by color values and sorted by counts, as described in more detail below).

Figure 4:
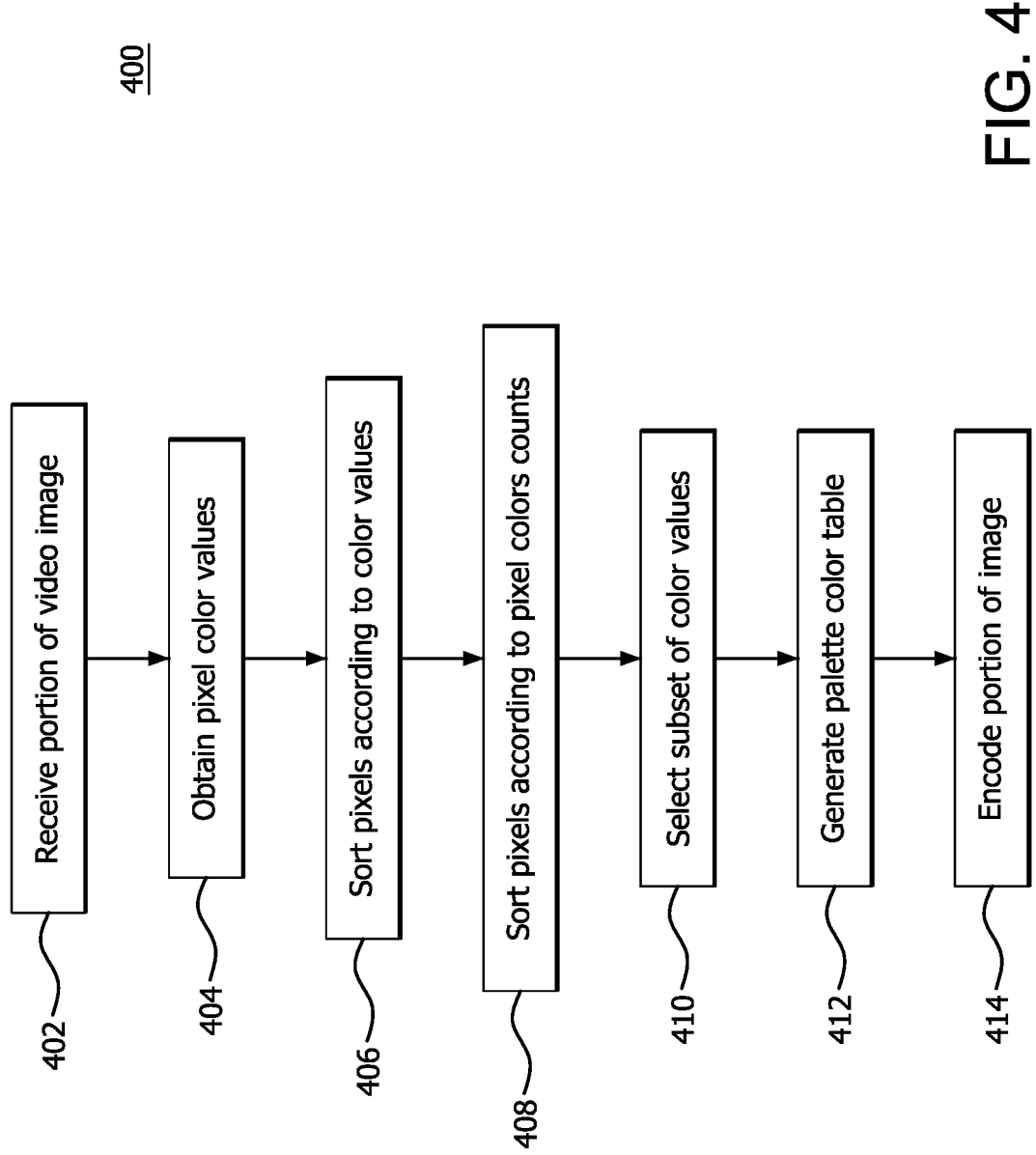
FIG. 4 is a flow diagram illustrating an example method of determining the most common palette pixel color values for a portion of pixels during video coding.

FIG. 4 is a flow diagram illustrating an example method 400 of determining the most common palette pixel color values for a portion of pixels during video coding. For simplified explanation purposes, the example method 400 described below includes encoding a portion of a frame (e.g., block of 8 pixels, such as a 4×2 block) of a video image (e.g., frame). Features of the present disclosure can be implemented by encoding any number of pixels (e.g., any number of pixels of a frame or a plurality of frames) at a time. In addition, as described above, features of the present disclosure can be implemented by encoding addressable elements of an image other than pixels, such as subpixels (e.g., color values of subpixels), in addition to, or alternative to, pixels of an image. For simplified explanation purposes, the example method 400 is also described for determining the most common pixel color values for palette mode coding. Features of the present disclosure can be implemented, however, for any type of encoding including a histogram calculation in which the number of elements being processed is smaller than the range of all possible element values.

As shown in block 402, the method 400 includes receiving a portion (e.g., pixel block) of a video image (e.g., frame). For example, a frame is parsed into a plurality of pixel blocks (e.g., blocks of 8 pixels) to be encoded separately. Features of the present disclosure can be implemented by encoding any number of pixels (e.g., any number of pixels of a frame or pixels of a plurality of frames) at a time. The size of each block (e.g., the number of pixels) and the number of blocks can be determined prior to runtime or dynamically determined during runtime.

As shown in block 404, the method 400 includes obtaining the pixel color values of the pixels being processed. FIG. 5A is a table 502 illustrating example pixel color values of 8 unsorted pixels of a block of 8 pixels being processed. Each of the color values and counter values shown in table 502 are, for example, stored in memory 104 (e.g., cache 306).

The first row of table 502 indicates the color values of the 8 pixels. The second row of table 502 indicates counter values of the 8 pixels. Each of the counter values indicates a value of 1 representing a single occurrence of the color value for the corresponding pixel. For example, as shown in table 502, a color value of 101 is read (e.g., by processor 302) for the first pixel in the block of 8 pixels and stored. A color value of 87 is then read for the second pixel in the 8 pixel block, followed by a color value of 25 for the third pixel and a color value of 43 for the fourth pixel.

A color value of 87 is read (e.g., by processor 302) for the fifth pixel in the 8 pixel block. Although the value 87 for the fifth pixel is the second occurrence of the value 87 (a value of 87 was also read for the second pixel) for the first 5 pixels, the counter value is not 2, but is a value of 1 for the fifth pixel, representing the occurrence of the color value 87 for that specific pixel (i.e., the $5^{th}$ pixel). The values of 25, 87 and 16 are then read for the three remaining pixels in the 8 pixel block.

As shown in block 406, the method 400 includes sorting the pixels within the portion of pixels being processed according to the color values of the pixels to obtain corresponding counts of the color values. The purpose of sorting the pixels according to the color values is not to obtain a sorted sequence of color values, but rather to efficiently read color values of the pixels and count the number of occurrences of each color value. When two or more pixels have the same color value, the counters for the pixels are combined into a single counter, resulting in one non-zero counter for the pixels with that color value.

FIG. 5B is a table 504 illustrating the 8 pixels of the 8 pixel block sorted according to their color pixel values. In addition to the color value, each pixel is assigned a counter value. The first row of table 504 indicates the color values of the 8 pixels. The second row of table 504 indicates counter values of the 8 pixels. As shown in FIG. 5B, the 8 pixels of the 8 pixel block are sorted by color values in ascending order (from left to right in table 504), starting with the lowest read color value of 16 and ending with the highest read color value of 101. The pixels can, however, be sorted in any direction, including ascending or descending order. In this example shown at FIG. 5B, the counter values are incremented by an integer value of 1 for each color value. Alternatively, the counter values can start at a predetermined number and be decremented to indicate the number of occurrences of each pixel color value.

As shown in the first column of the table 504 in FIG. 5B, the color value 16 is indicated having a counter value of 1, representing a single occurrence of the color value 16 (for the 8th pixel) for the 8 pixels of the 8 pixel block.

As shown in the second column of the table 504 in FIG. 5B, the color value 25 is indicated having a counter value of 2, while the color value 25 in the third column of FIG. 5B is indicated as having a counter value of 0. That is, because the third and sixth pixels of the 8 pixels in the 8 pixel block have the same color value of 25, the count values for the two pixels are combined into a single counter, resulting in one non-zero counter value (i.e., counter value of 2) for the pixels with the color value of 25 and the counter value for the other pixel in the third column is set to 0.

As shown the table 504 in FIG. 5B, the fourth column shows the color value 43 having a counter value of 1, representing a single occurrence of the color value 43 (for the $4^{th}$ pixel) for the 8 pixels of the 8 pixel block.

The fifth column of the table 504 shows the color value 87 having a counter value of 3, while the color values of 87 in the sixth and seventh columns of FIG. 5B are each indicated as having a counter value of 0. That is, because the second, fifth and seventh pixels of the 8 pixels in the 8 pixel block have the same color value of 87, the counter values for the three pixels are combined into a single counter, resulting in one non-zero counter value (i.e., counter value of 3) for the three pixels with the color value of 87 while the counter values in the sixth and seventh columns are set to 0.

As shown in the eighth column of the table 504 in FIG. 5B, the color value 101 is indicated having a count of 1, representing a single occurrence of the color value 101 (for the 1st pixel) for the 8 pixels of the 8 pixel block.

As shown in block 408, the method 400 includes sorting the pixels according to their pixel colors counts (i.e., number of occurrences of each pixel color). That is, the pixels are sorted a second time, but this time the pixels, which were previously sorted according to color values, are sorted according to their counts.

FIG. 5C is a table 506 illustrating the 8 pixels of the 8 pixel block sorted according to their corresponding pixel color value counts (i.e., number of occurrences of each color value). The first row of table 506 indicates the color values of the 8 pixels of the 8 pixel block. The second row of table 506 indicates the counter values of the 8 pixels of the 8 pixel block. The 8 pixels shown in the table 506 are sorted according to their pixel color value counts in descending order (from left to right in table 506), starting with the highest counter value 3 and ending with the lowest counter values of 0. The pixels can, however, be sorted in any direction, including descending and ascending order of their pixel color value counts.

As shown in the table 506 in FIG. 5C, the first column shows the color value 87 having a counter value of 3, which was combined into a single non-zero counter for the three pixels (i.e., the second, fifth and seventh pixels) with the color value of 87. The second column of the table 506 shows the color value 25 having a counter value of 2 representing the 2 occurrences of the color value 25 (for the third and sixth pixels).

The third, fourth and fifth columns show the color values of 16, 43 and 101 (for the eighth, fourth and first pixels), respectively, each having a counter value of 1 representing the single occurrence of these color values. The sixth, seventh and eighth columns show the color values of 0 for the three pixels whose counter values were set to 0 due to their corresponding counter values being combined into a single non-zero counter value.

The sorting of the pixels according to color pixel values, described above with regard to block 406, and the sorting of the pixels according to color value counts, described above with regard to block 408, are merely examples of sorting used to implement features of the disclosure. The sorting according to color pixel values and color value counts can include other sorting techniques based on different parameters, for example storage capacity and encoding parameters during run time. For example, bitonic sorting, for sorting the elements in parallel, can be used to sort the pixels according to color pixel values and color value counts.

As shown in block 410, the method 400 includes selecting a subset of the different color values. The different values in the selected subset are the values having the N-most number of occurrences. That is, the different color values in the subset have corresponding numbers of occurrences that are higher than corresponding numbers of occurrences of other color values. For example, using the example described above with regard to FIGS. 5A-5C, if the N-most number of occurrences is 2, then the color values having the 2-most number of occurrences are 87 (have 3 occurrences) and 25 (having 2 occurrences). Accordingly, are selected as the color values 87 and 25 are selected as the subset of the different color values. The N-most number of occurrences is determined prior to run time or dynamically determined during runtime to efficiently encode the portion of pixels.

As shown in block 412, the method 400 includes generating a palette color table using the subset of the different color values. For example, if the N-most number of occurrences is 2, a palette color table is generated using the color values 87 and 25 to efficiently encode the 8-pixel block. As shown at block 414, the method 400 includes encoding the portion of pixels (e.g., the 8 pixel block) using the generated palette color table.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, the input driver 112, the input devices 108, the output driver 114, the output devices 110, the accelerated processing device 116, the scheduler 136, the graphics processing pipeline 134, the compute units 132, the SIMD units 138, the encoder 140, the transmitter 304 and the counter 308 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An encoding method of determining common element values, the method comprising:
   receiving a plurality of images;
   obtaining color values of elements in a portion of the images;
   combining counter values of two or more elements having a same color value into a single non-zero counter value representing a number of occurrences of the two or more elements and setting counter values for other of the two or more elements to zero;
   sorting the elements according to different color values of the elements;
   sorting the elements according to the number of occurrences of the different color values; and
   encoding the elements using a subset of the different color values having corresponding numbers of occurrences that are higher than corresponding numbers of occurrences of other color values.

2. The encoding method of claim 1, further comprising selecting the subset of the different color values,
   wherein the different color values in the selected subset are the color values having an N-most number of occurrences.

3. The encoding method of claim 2, wherein the N-most number of occurrences is determined prior to run time.

4. The encoding method of claim 1, wherein
   the elements are pixels of a frame, and
   the method further comprises:
   generating a palette color table using a subset of the different color values having corresponding numbers of occurrences that are higher than corresponding numbers of occurrences of other color values; and
   encoding the pixels using the generated palette color table.

5. The encoding method of claim 1, further comprising:
   storing the different color values of the elements; and
   storing the number of occurrences of the different color values as the counter values.

6. The encoding method of claim 1, wherein sorting the elements according to the different color values and sorting the elements according to the number of occurrences comprises bitonic sorting.

7. A palette mode encoding method comprising:
   receiving a plurality of images;
   obtaining different color values for a portion of pixels in the images;
   storing the different color values of the pixels;
   storing the number of occurrences of the different color values as counter values;
   sorting the portion of pixels according to the different color values;
   sorting the pixels according to the number of occurrences of the different color values; and
   encoding the portion of pixels using a subset of the different color values having corresponding numbers of occurrences that are higher than corresponding numbers of occurrences of other color values,
   wherein sorting the pixels according to the different color values of the pixels further comprises combining the counter values for two or more pixels having a same color value into a single non-zero counter value for one of the two or more pixels and setting the counter values for other of the two or more pixels to zero.

8. The method of claim 7, further comprising selecting the subset of the different color values,
wherein the different color values in the selected subset are the color values having the N-most number of occurrences.

9. The method of claim 8, wherein the N-most number of occurrences is determined prior to run time.

10. The method of claim 7, wherein
the portion of pixels is a block of pixels of a frame, and
the method further comprises:
generating a palette color table using the subset of the different color values; and
encoding the pixels using the generated palette color table.

11. The method of claim 7, wherein sorting the pixels according to the different color values and sorting the pixels according to the number of occurrences comprises bitonic sorting.

12. A processing device for encoding video using palette mode encoding, the processing device comprising:
memory; and
a processor configured to:
receive a plurality of images;
obtain different color values of a portion of pixels in the images;
combine counter values of two or more pixels having a same color value into a single non-zero counter value representing a number of occurrences of the two or more pixels and setting counter values for other of the two or more elements to zero;
sort the portion of pixels according to the different color values;
sort the portion of pixels according to the number of occurrences of the different color values; and
encode the portion of pixels using a subset of the different color values having corresponding numbers of occurrences that are higher than corresponding numbers of occurrences of other color values.

13. The processing device of claim 12, further comprising an encoder configured to encode, via the processor, the portion of pixels.

14. The processing device of claim 12, wherein the processor is configured to select the subset of the different color values, wherein the different color values in the selected subset are the color values having an N-most number of occurrences.

15. The processing device of claim 14, wherein the N-most number of occurrences is determined prior to run time.

16. The processing device of claim 12, wherein
the portion of pixels is a block of pixels of a frame, and
the processor is further configured to:
generate a palette color table using the subset of the different color values; and
encode the pixels using the generated palette color table.

17. The processing device of claim 12, further comprising a counter configured to count, via the processor, the number of occurrences of the different color values.

18. The processing device of claim 17, wherein the processor is configured to:
store the different color values of the pixels; and
store the number of occurrences of the different color values, provided by the counter, as counter values.

19. The processing device of claim 12, wherein sorting the pixels according to the different color values and sorting the pixels according to the number of occurrences comprises bitonic sorting.

20. The processing device of claim 12, further comprising a display device, wherein the images are displayed at the display device.

* * * * *